Figure 1:
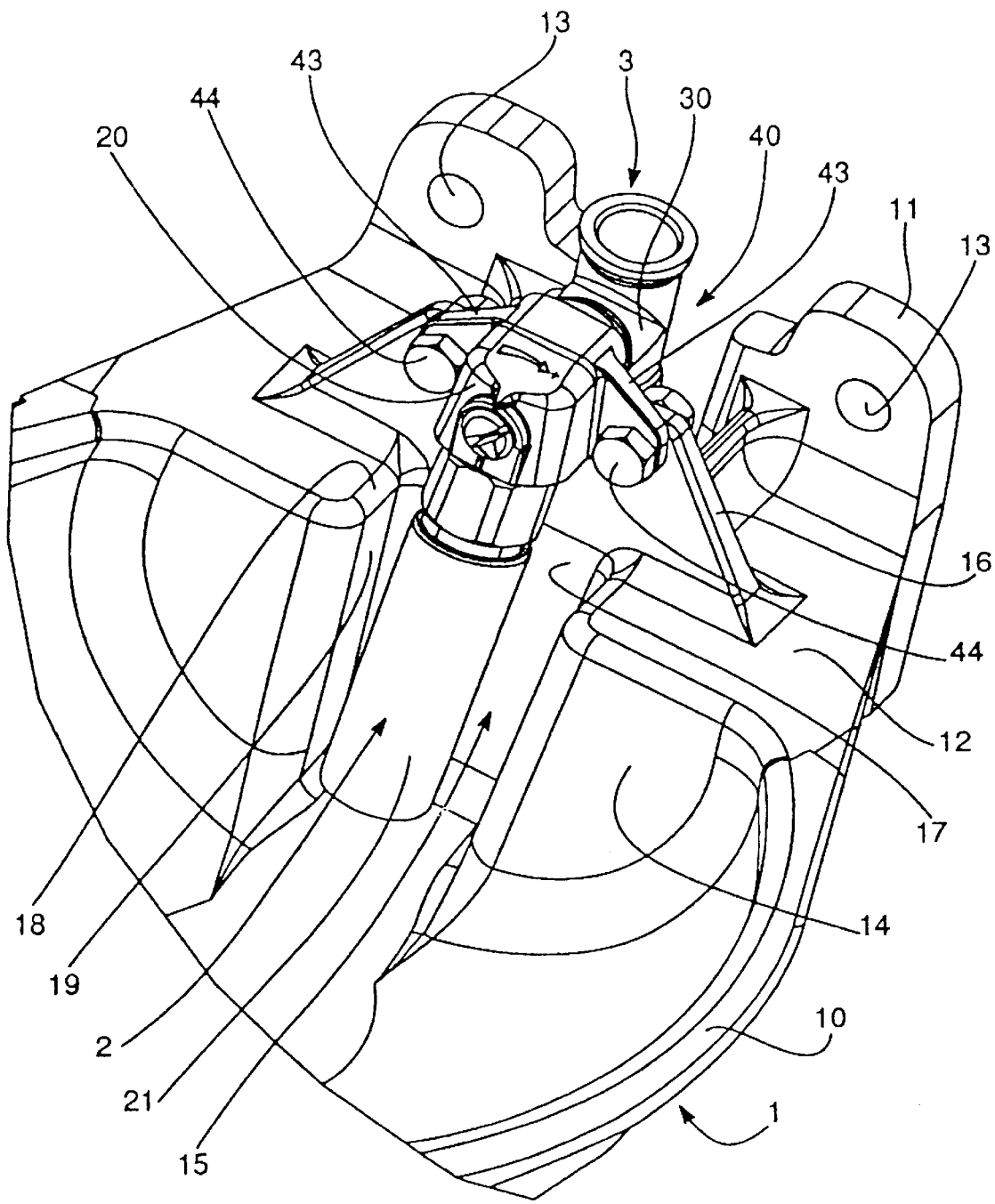

United States Patent [19]
Gustin

[11] Patent Number: 6,101,976
[45] Date of Patent: Aug. 15, 2000

[54] INDIVIDUAL WATERING BOWL WITH MULITDIRECTIONAL CONNECTION OF THE TYPE COMPRISING A BOWL AND PLUMBING

[75] Inventor: Jean-Pierre Gustin, Charleville-Mezieres, France

[73] Assignee: La Buvette, Tournes, France

[21] Appl. No.: 09/245,879

[22] Filed: Feb. 8, 1999

[30] Foreign Application Priority Data

Feb. 6, 1998 [FR] France ................................ 98 01397

[51] Int. Cl.[7] .............................. A01K 7/06; A01K 39/02
[52] U.S. Cl. ................................................. 119/74; 119/75
[58] Field of Search ........................... 119/72, 72.5, 74, 119/75

[56] References Cited

U.S. PATENT DOCUMENTS

| | | | |
|---|---|---|---|
| 2,067,112 | 1/1937 | Ahlman | 119/75 |
| 2,260,817 | 10/1941 | Anderson | 119/75 |
| 2,362,620 | 11/1944 | Eischens | 119/75 |
| 3,101,071 | 8/1963 | Frye | 119/74 |
| 4,471,722 | 9/1984 | Dube et al. | 119/75 |
| 4,476,812 | 10/1984 | Dube et al. | 119/75 |
| 4,656,970 | 4/1987 | Hostetler | 119/75 |

FOREIGN PATENT DOCUMENTS

| | | |
|---|---|---|
| 0 486 373 | 5/1992 | European Pat. Off. |
| 37 21 467 | 4/1988 | Germany |

*Primary Examiner*—Peter M. Poon
*Assistant Examiner*—Elizabeth Shaw
*Attorney, Agent, or Firm*—Young & Thompson

[57] ABSTRACT

An individual watering bowl with a multidirectional connection, comprising a bowl (1) constituted by a basin (10) connected to a rear surface (11) by a shoulder (12) and plumbing (2). A valve body (20) and a manipulating member (21) are adapted to be connected to a water inlet conduit by a connection (3). There is, disposed between the basin and the rear surface, a wall (16) secured to the shoulder (12) and perpendicular to the shoulder (12) and parallel to the rear surface (11) on which is secured the plumbing (2), whereby the connection (3) can be arranged in at least five directions.

7 Claims, 2 Drawing Sheets

INDIVIDUAL WATERING BOWL WITH MULITDIRECTIONAL CONNECTION OF THE TYPE COMPRISING A BOWL AND PLUMBING

This application corresponds to French application 98 01397 of Feb. 6, 1998, the disclosure of which is incorporated herein by reference.

The present invention relates to a watering bowl for livestock, adapted to be installed inside, in a stable, as well as outside, in a field.

In a manner known per se, such watering bowls are constituted by a bowl of overall semispherical shape comprising a flat rear face protruding upwardly by which it is positioned and fixed on a wall or a tube, and on which is positioned plumbing.

The plumping comprises a manipulating member extending generally vertically within the bowl. This manipulating member can be a plate or a pipe connected to the plumbing such that the water inlet valve will be open as soon as an animal pushes on the manipulating means. When the manipulating means is a pipe, the latter can be displaced in a multitude of directions about its rest position so as to open the water inlet valve.

The plumbing is secured to a right angle connection or a T connection mounted on the water inlet conduit.

Numerous arrangements have already been proposed to facilitate mounting the watering bowl on its support and above all to facilitate mounting of the plumbing on the bowl and its connection to the water inlet conduit.

Usually, the end of the plumbing passes through an opening provided in the rear wall of the bowl, and the shoulder connecting the bowl and the rear mounting surface is separated into two portions so as to leave a free recess in which is disposed a connection when the water inlet takes place from above the bowl.

These various arrangements permit easily mounting and unmounting the plumbing whilst leaving the bowl fixed to its support so as to facilitate maintenance operations.

The present invention provides a watering bowl which, as needed, can be either disconnected from the plumbing of the water inlet conduit without having to take off the bowl, or taking off the bowl without having to disconnect the plumbing of the water inlet conduit, this watering bowl having moreover the advantage of being adapted to be connected in five possible directions to a water supply conduit.

To this end, the invention provides an individual watering bowl with multidirectional connection, of the type comprising a bowl constituted by a basin connected to a rear surface by a shoulder and plumbing, constituted by a valve body and a manipulating member, adapted to be connected to a water inlet conduit by means of a connection, characterized in that it carries, disposed between the basin and the rear surface, a wall secured to the shoulder, perpendicular to said shoulder and parallel to the rear surface on which is fixed the plumbing, such that said connection may be arranged in at least five directions.

The watering bowl according to the invention is further remarkable in that:

the upper edge of the wall has a cutout adapted to permit the passage of the end portion of the valve body before being fixed to the connection, the valve body is bordered by two ears adapted to be positioned against the front surface of the wall, and to prevent the securement of the plumbing to said wall by emplacement of bolts, the shoulder has, facing the basin, a rectangular opening bordered by a bottom and side faces connected to the rear wall of the basin, so as to create a reinforcement, the wall is disposed in prolongation of the bottom of said reinforcement, when the shoulder and the rear surface are in two parts defining between them a free recess, said wall closes said free recess, the valve body is traversed by a cylindrical drain mounted rotatably and having a trapezoidal opening whose position relative to the recess of the valve body ensures adjustment of the flow rate of water in the plumbing.

Figure 2:
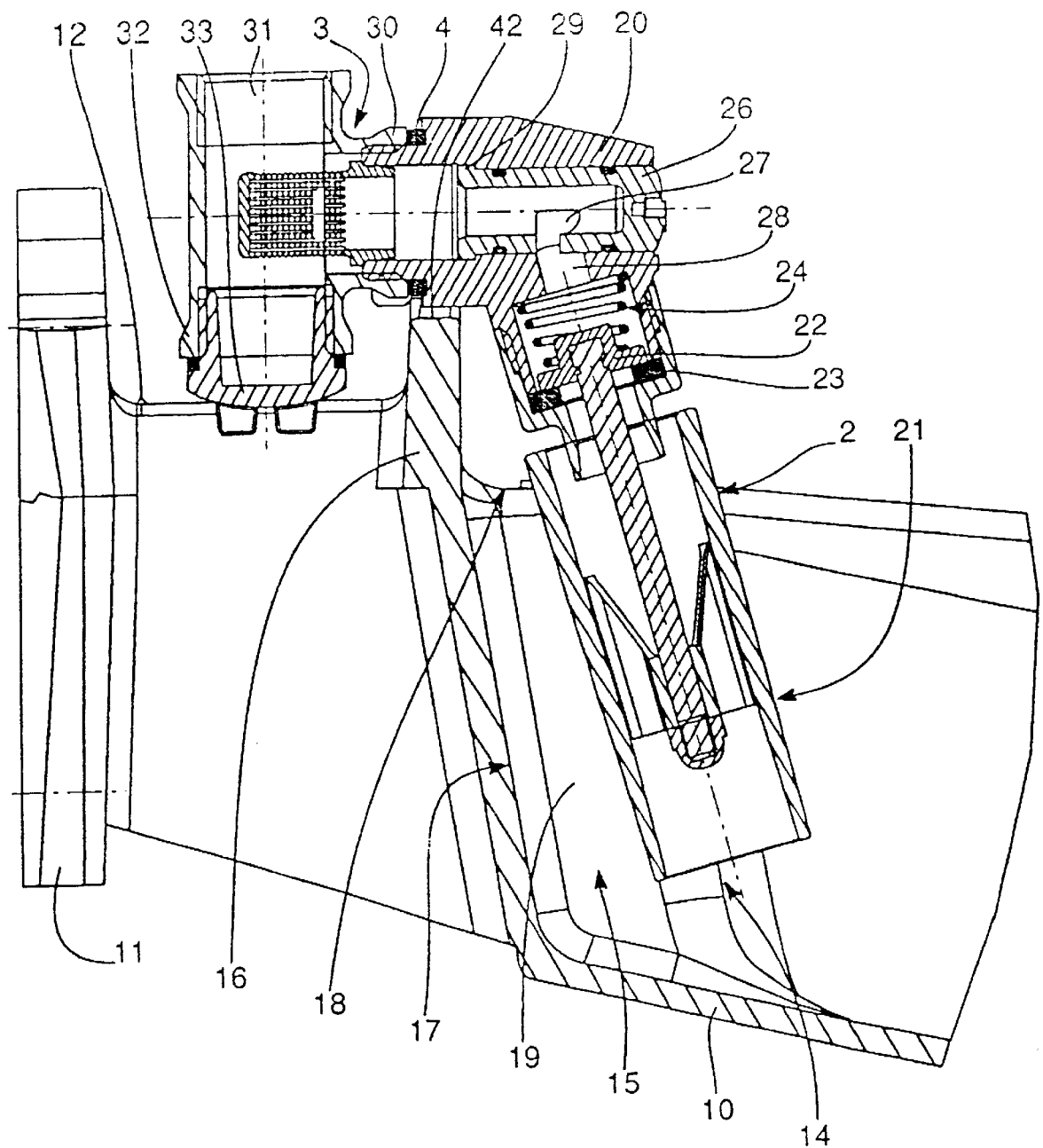

The invention will be better understood from the description which follows, given by way of non-limiting example, with reference to the accompanying drawings, in which:

FIG. 1 is a perspective view of the watering bowl according to the invention, and FIG. 2 is a cross-sectional view on the line II—II of FIG. 1.

As is seen in FIG. 1, the watering bowl according to the invention comprises in known matter a bowl 1 constituted by a basin 10 overall semispherical, connected by a shoulder 12 to a rear surface 11.

The bowl 1 is adapted to be fixed with the open surface of the basin 10 in a substantially horizontal plane, the shoulder 12 being also substantially horizontal whilst the rear surface 11 is substantially vertical and is fixed on a wall or tube against which it is disposed. The securement means of the bowl 1, not shown in the drawing, are constituted by bolts or by ends of a stirrup disposed in the openings 13 of the rear surface 11.

The shoulder 12 has, facing the basin 10, a rectangular opening 18 bordered by a bottom 17 and side surfaces 19 connected to the rear wall 14 of the basin 10, so as to create a reinforcement 15.

The plumbing 2 is disposed in a manner to be positioned adjacent the rear wall 14 of the bowl 10, in the reinforcement 15, and substantially parallel to said rear wall. Said plumbing 2 is secured to a T-shaped connector 3 adapted to be mounted on the water inlet conduit (not shown in the drawing).

In a manner known per se, the shoulder 12 and the rear surface 11 are separated in two portions so as to leave a free recess 40 in through which extends the upper portion of the connection 3 adapted to be secured to the water inlet conduit when the latter is disposed above the watering bowl.

The plumbing 2 shown in the drawing comprises a valve body 20 adapted to be secured to the connection 3 and the manipulating member 21 constituted by a disassembable nozzle on which the animals act. The valve body 20 encloses the water inlet valve constituted by a closure 22 urged against a seat 23 by a return spring 24.

As is seen in FIG. 2, the valve body 20 is traversed by a cylindrical drain 26 mounted rotatably, whose end located opposite the connection 3 is closed whilst the end located near said connection 3 is open and has flared collar 20. Said collar 29 ensures retention of the drain 26 in the valve body.

The cylindrical drain 26 has a trapezoidal opening 27 permitting the adjustment of the water flow rate admitted into the plumbing. The rotatable mounting of the drain 26 in the valve body 20 permits orienting said drain so as to adapt it to the position of the opening 27 relative to the bore 28 for the water flow rate that it is desired to obtain through the plumbing. The trapezoidal shape of the opening 27 and the fact that it does not extend over all the circumference of the drain 26, permits adjusting as desired the water flow rate in the plumbing between zero flow rate and a maximum flow rate fixed by the pressure in the water inlet conduit and the diameter of the bore 28.

Such an arrangement can be manipulated with complete safety. There is not, as in known arrangements using a flow control screw, the risk of loss or of breaking the closure means.

According to the invention, a wall 16 is provided, secured to the shoulder 12, perpendicular to said shoulder 12 and parallel to the rear surface 11. This wall 16 is disposed in prolongation of the bottom 17 of the reinforcement 15 and thus closes the free recess 40.

The upper edge of the wall 16 has an indentation 42 adapted to permit the passage of the end portion 25 of the valve body 20 before being secured to the connection 3.

As can be seen from FIG. 2, the valve body 20 is disposed within the indentation 42 of the wall 16, with clearance.

As can be seen in FIG. 1, the end position 25 of the valve body 20 is bounded by two ears 43 adapted to be positioned against the front surface of the wall 16, and to permit the securement of the plumbing to said wall 16 by emplacement through bolts 44. The wall 16 being disposed in prolongation of the bottom 17 of the reinforcement 15, the plumbing 2 fixed to said wall 16 is conveniently disposed in said reinforcement 15.

By such a mounting, it is thus possible to carry out the plumbing, which is to say the mounting of the plumbing 2 on the connection 3, fixed to the water inlet nozzle (not shown in the drawing), independently, either before, or after, the mounting of the bowl 1 on the wall of the tube which must support it.

The plumbing and the bowl are not secured together other than by emplacement of the bolts 44 through the ears 43 of the valve body 20 and the wall 16. This securement together is very simple to carry out because of the bolts used passing through the openings of the wall 16 and are readily accessible, it is less subject to grippage, contrary to the mountings using positioning screws in the casting. Moreover, this securement can be carried out at several points in the course of mounting, according to the preference of the person doing the mounting. It can also be selected to mount the bowl and not to secure it to the valve body until having completed mounting the plumbing on the water inlet conduit, so as to facilitate assembly of the plumbing.

The arrangement according to the invention is interesting above all when operations are to be carried out on the watering bowl because it is possible to remove the plumbing from the bowl by taking off the bolts 44 and disassembling as needed, either the plumbing or the bowl, leaving the other in place.

In the arrangement according to the invention, the end portion 25 of the valve body is located both above the shoulder 12 and the free space 40, which facilitates emplacement of the connection 3 and permits its orientation in different directions.

In the drawing, the connection 3 is mounted with its branches 31 and 32, which are in prolongation of each other, oriented vertically. The end of the upper branch 31 is open to permit connection to the water inlet conduit, whilst the end of the lower branch 32 is closed by a plug 33.

In a modification, said branches 31 and 32 can be disposed horizontally in the space above the shoulder 12, between the rear surface 11 and the wall 16.

The connection 3 with three branches can, in a manner known per se, be replaced by a connection with two branches disposed at a right angle.

According to another modification, the water inlet conduit can be disposed horizontally and connected to the plumbing by a straight sleeve mounted through the recess 40.

The watering bowl according to the invention can thus have five possible directions of connection.

What is claimed is:

1. In an individual watering bowl with a multidirectional connection, comprising a bowl (1) constituted by a basin (10) connected to a rear surface (11) by a shoulder (12) and plumbing (2), further comprising a valve body (20) and a manipulating member (21) adapted to be connected to a water inlet conduit by means of a connection (3); the improvement in which there is, disposed between the basin and the rear surface, a wall (16) secured to the shoulder (12) and perpendicular to said shoulder (12) and parallel to said rear surface (11) on which is secured the plumbing (2), whereby said connection (3) can be arranged in at least five directions.

2. A watering bowl as claimed in claim 1, wherein the upper edge of said wall (16) has an indentation (42) adapted to leave a passage to an end portion (25) of said valve body (20) before being secured to the connection (3).

3. A watering bowl as claimed in claim 1, wherein the valve body (20) has two ears (43) adapted to be positioned against a forward surface of the wall (6) and to permit the securement of the plumbing to the said wall (16) with bolts (44).

4. A watering bowl as claimed in claim 1, wherein said shoulder (12) has, facing said basin (10), a rectangular opening (18) bordered by a bottom (17) and lateral surfaces (19) connected to a rear wall (14) of the basin (10) so as to create a reinforcement (15).

5. A watering bowl as claimed in claim 4, wherein said wall (16) is disposed in prolongation of the bottom (17) of said reinforcement (15).

6. A watering bowl as claimed in claim 1, in which said shoulder (12) and said rear surface (11) are in two portions defining between them a recess (40), said wall (16) closing said recess (40).

7. A watering bowl as claimed in claim 1, wherein said valve body (20) is traversed by a cylindrical drain (26) mounted rotatably and having a trapezoidal opening (27) whose position relative to a bore (28) of said valve body (20) ensures the adjustment of the water flow rate though the plumbing.

\* \* \* \* \*